United States Patent
Jonasson

(10) Patent No.: US 7,903,804 B2
(45) Date of Patent: Mar. 8, 2011

(54) SYSTEM AND METHOD FOR MANAGING MULTIPLE CODES FOR A TELEPHONE NUMBER

(75) Inventor: Andreas Jonasson, Ronninge (SE)

(73) Assignee: Sony Ericsson Mobile Communications AB, Lund (SE)

( * ) Notice: Subject to any disclaimer, the term of this patent is extended or adjusted under 35 U.S.C. 154(b) by 1186 days.

(21) Appl. No.: 11/469,955

(22) Filed: Sep. 5, 2006

(65) Prior Publication Data

US 2008/0069329 A1 Mar. 20, 2008

(51) Int. Cl.
*H04M 3/42* (2006.01)
*H04M 1/00* (2006.01)

(52) U.S. Cl. .............. 379/202.01; 455/566; 455/564

(58) Field of Classification Search ........... 455/556, 455/564, 566; 370/260; 379/202.01; 715/864
See application file for complete search history.

(56) References Cited

U.S. PATENT DOCUMENTS

| 5,719,928 | A * | 2/1998 | Pinnell et al. ........... 379/202.01 |
| 6,125,287 | A * | 9/2000 | Cushman et al. .............. 455/566 |
| 7,503,016 | B2 * | 3/2009 | Hawkins et al. ................ 715/864 |
| 2002/0136382 | A1 * | 9/2002 | Cohen et al. ............ 379/202.01 |
| 2002/0193142 | A1 * | 12/2002 | Stavenow et al. ............. 455/556 |
| 2004/0121814 | A1 | 6/2004 | Creamer et al. |
| 2005/0094794 | A1 * | 5/2005 | Creamer et al. .......... 379/202.01 |
| 2005/0135279 | A1 * | 6/2005 | Zabawskyj ..................... 370/260 |
| 2005/0250546 | A1 * | 11/2005 | Asthana ........................ 455/564 |

FOREIGN PATENT DOCUMENTS

| EP | 0713319 | 5/1996 |
| EP | 0809385 | 11/1997 |
| EP | 1041804 | 10/2000 |
| WO | 97/09815 | 3/1997 |
| WO | 00/38400 | 6/2000 |
| WO | 02/087204 | 10/2002 |
| WO | 03/058940 | 7/2003 |

OTHER PUBLICATIONS

International Search Report from corresponding International Application No. PCT/IB2007/000438.
International Preliminary Report on Patentability form corresponding International Application No. PCT/IB2007/000438.

* cited by examiner

*Primary Examiner* — Ahmad F Matar
*Assistant Examiner* — Sonia Gay
(74) *Attorney, Agent, or Firm* — Renner, Otto, Boisselle & Sklar, LLP

(57) ABSTRACT

A method of managing multiple codes for a telephone number includes associating plural codes with the telephone number. Each code has a user recognizable name. At least the names of the codes are displayed for user selection. A signal in accordance with the code that corresponds to a user selected one of the names is transmitted to a remote location.

14 Claims, 3 Drawing Sheets

SYSTEM AND METHOD FOR MANAGING MULTIPLE CODES FOR A TELEPHONE NUMBER

TECHNICAL FIELD OF THE INVENTION

The present invention relates generally to managing data in an electronic device such as a mobile telephone and, more particularly, to a system and method for managing multiple codes that are associated with a telephone number.

DESCRIPTION OF THE RELATED ART

Telephone conferencing systems have become a popular way for multiple people that are not in the same location to engage in an audio meeting, often referred to as a conference call. For many conferencing systems, each participant in the conference call initiates a call to a centralized telephone number. Such a centralized telephone number is sometimes referred to as conference bridge phone number. In the United States, for example, the number may be a "toll-free" number established by a telephone conference service provider.

The centralized telephone number may support a number of conference calls. To distinguish the conference call for which the user wishes to participate, the conferencing system requests a code (e.g., an identification number) from the user. Upon entering the code, the system may connect the user to the corresponding conference call. Codes are typically transmitted as dial tone multi frequency (DTMF) signals that are decoded by the telephone conferencing system. The code also may be used to track conferencing service usage and/or to bill an appropriate account.

For a single centralized telephone number, a user may be aware of multiple codes. Each of the multiple codes may correspond to a different conference. Some of the codes may have a one time use. Other codes may be used multiple times, such as for use in joining a conference call that reoccurs on a routine or intermittent basis. For instance, a corporate employee may participate in a weekly conference call with vendors that is scheduled for a particular time on a predetermined day of the week and the employee may participate in a conference call with a group of colleagues a few times a month, but at times that are not regularly scheduled. To minimize the coordination for these conference calls, each reoccurring conference call may have an established code that is known to the various participants. Multiple codes, however, are difficult to remember.

SUMMARY

To improve a user's ability to transmit information to a remote location, such as a telephone conference system, there is a need in the art for a system and method for enhanced management of multiple codes (e.g., identification numbers) that are associated with a telephone number.

According to one aspect of the invention, a method of managing multiple codes for a telephone number includes associating plural codes with the telephone number, each code having a user recognizable name; displaying at least the names of the codes for user selection; and transmitting a signal in accordance with the code that corresponds to a user selected one of the names to a remote location.

According to one embodiment of the method, the code is transmitted as DTMF signals.

According to one embodiment of the method, the transmitting is carried out after establishing a call to the telephone number.

According to one embodiment of the method, the displaying is carried out after user selection of a send code menu option that is made available in connection with the display or dialing of the telephone number.

According to one embodiment of the method, the displaying displays the name and a value of each code.

According to one embodiment of the method, the codes are identification numbers for a conference call system reachable through the telephone number and each code is associated with a different, reoccurring conference call.

According to one embodiment of the method, the codes are telephone extension numbers for connecting to corresponding telephone extensions reachable through the telephone number.

According to one embodiment of the method, the codes are personal identification numbers for use with a secure system.

According to one embodiment of the method, the names are established by the user.

According to one embodiment of the method, the codes and the names are maintained as part of a contact list database.

According to another aspect of the invention, a program for managing multiple codes for a telephone number is stored in a machine readable medium and includes executable logic to associate plural codes with the telephone number, each code having a user recognizable name; display at least the names of the codes for user selection; and transmit a signal in accordance with the code that corresponds to a user selected one of the names to a remote location.

According to one embodiment of the program, the transmitting is carried out after establishing a call to the telephone number.

According to one embodiment of the program, the displaying is carried out after user selection of a send code menu option that is made available in connection with the display or dialing of the telephone number.

According to one embodiment of the program, the codes are identification numbers for a conference call system reachable through the telephone number and each code is associated with a different, reoccurring conference call.

According to one embodiment of the program, the codes are telephone extension numbers for connecting to corresponding telephone extensions reachable through the telephone number.

According to one embodiment of the program, the codes are personal identification numbers for use with a secure system.

According to another aspect of the invention, an electronic device includes a radio circuit that establishes telephone calls with a remotely located device; and a control circuit that carries out logical operations to manage multiple codes for a telephone number, including associate plural codes with the telephone number, each code having a user recognizable name; drive a display to display at least the names of the codes for user selection; and transmit a signal in accordance with the code that corresponds to a user selected one of the names to a remote location.

According to one embodiment of the electronic device, the transmitting is carried out after establishing a call to the telephone number.

According to one embodiment of the electronic device, the displaying is carried out after user selection of a send code menu option that is made available in connection with the display or dialing of the telephone number.

According to one embodiment of the electronic device, the codes are identification numbers for a conference call system reachable through the telephone number and each code is associated with a different, reoccurring conference call.

According to one embodiment of the electronic device, the codes are telephone extension numbers for connecting to corresponding telephone extensions reachable through the telephone number.

According to one embodiment of the electronic device, the codes are personal identification numbers for use with a secure system.

According to one embodiment of the electronic device, the codes and the names are maintained as part of a contact list database.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

DETAILED DESCRIPTION OF EMBODIMENTS

Figure 1:
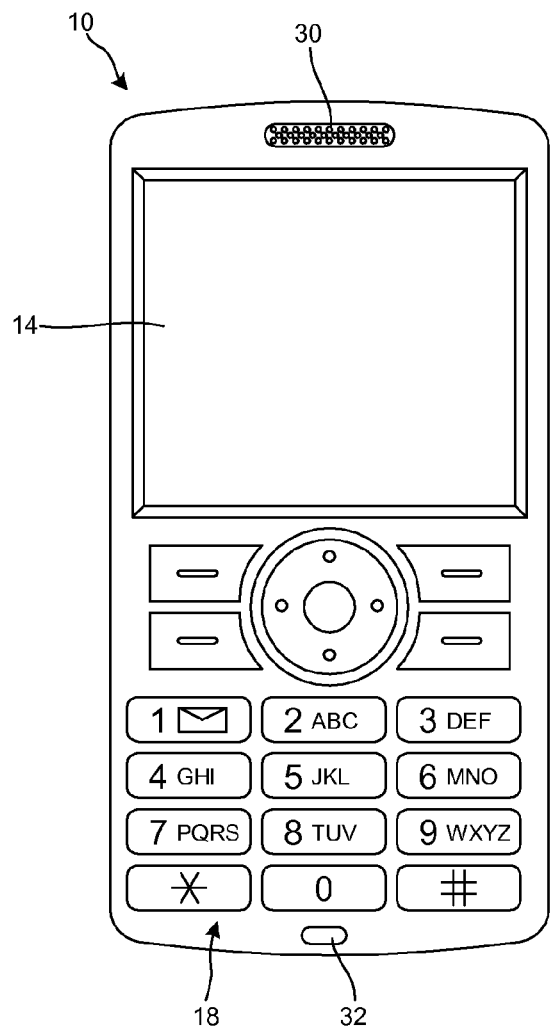
FIG. 1 is a schematic view of a mobile telephone as an exemplary electronic device in accordance with an embodiment of the present invention.

The present invention will now be described with reference to the drawings, wherein like reference numerals are used to refer to like elements throughout. It will be understood that the figures are not necessarily to scale.

The interchangeable terms "electronic equipment" and "electronic device" include portable radio communication equipment. The term "portable radio communication equipment," which herein after is referred to as a "mobile radio terminal," includes all equipment such as mobile telephones, pagers, communicators, electronic organizers, personal digital assistants (PDAs), smartphones, portable communication apparatus or the like.

In the present application, the invention is described primarily in the context of a mobile telephone. However, it will be appreciated that the invention is not intended to be limited to a mobile telephone and can be any type of appropriate electronic equipment, examples of which include a voice over internet protocol (VoIP) telephone (which may be implemented with dedicated equipment, a personal computer or other suitable device) and a plain old telephone system (POTS) telephone.

Figure 2:
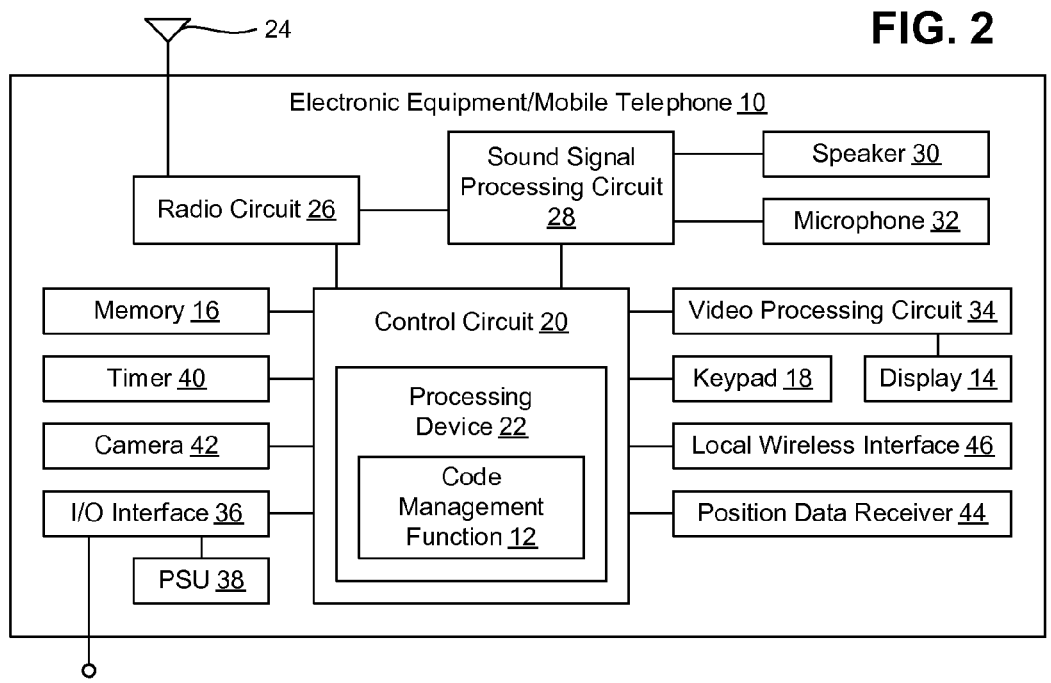
FIG. 2 is a schematic block diagram of the relevant portions of the mobile telephone of FIG. 1 in accordance with an embodiment of the present invention.

Referring initially to FIGS. 1 and 2, an electronic device 10 is shown. The electronic device 10 includes a code management function 12 that is configured to manage multiple codes in association with a single telephone number. Additional details and operation of the code management function 12 will be described in greater detail below. The code management function 12 may be embodied as executable code that is resident in and executed by the electronic device 10. In one embodiment, the code management function 12 may be a program stored on a computer or machine readable medium. The code management function 12 may be a stand-alone software application or form a part of a software application that carries out additional tasks related to the electronic device 10.

The electronic device of the illustrated embodiment is a mobile telephone and will be referred to as the mobile telephone 10. The mobile telephone 10 is shown as having a "brick" or "block" form factor housing, but it will be appreciated that other type housings, such as a clamshell housing or a slide-type housing, may be utilized.

The mobile telephone 10 may include a display 14. The display 14 displays information to a user such as operating state, time, telephone numbers, contact information, various navigational menus, etc., which enable the user to utilize the various features of the mobile telephone 10. The display 14 also may be used to visually display content received by the mobile telephone 10 and/or retrieved from a memory 16 of the mobile telephone 10. The display 14 may be used to present images, video and other graphics to the user, such as photographs, mobile television content and video associated with games.

A keypad 18 provides for a variety of user input operations. For example, the keypad 18 typically includes alphanumeric keys for allowing entry of alphanumeric information such as telephone numbers, phone lists, contact information, notes, etc. In addition, the keypad 18 typically includes special function keys such as a "call send" key for initiating or answering a call, and a "call end" key for ending or "hanging up" a call. Special function keys may also include menu navigation and select keys, for example, for navigating through a menu displayed on the display 16 to select different telephone functions, profiles, settings, etc., as is conventional. Special function keys may include audiovisual content playback keys to start, stop and pause playback, skip or repeat tracks, and so forth. Other keys associated with the mobile telephone may include a volume key, an audio mute key, an on/off power key, a web browser launch key, a camera key, etc. Keys or key-like functionality may also be embodied as a touch screen associated with the display 14.

The mobile telephone 10 includes call circuitry that enables the mobile telephone 10 to establish a call and/or exchange signals with a called/calling device, typically another mobile telephone or landline telephone. However, the called/calling device need not be another telephone, but may be some other device such as an Internet web server, content providing server, etc. Calls may take any suitable form. For example, the call could be a conventional call that is established over a cellular circuit-switched network or a voice over Internet Protocol (VoIP) call that is established over a packet-switched capability of a cellular network or over an alternative packet-switched network, such as WiFi, WiMax, etc. Another example includes a video enabled call that is established over a cellular or alternative network.

The mobile telephone 10 may be configured to transmit, receive and/or process data, such as text messages (e.g., colloquially referred to by some as "an SMS"), electronic mail messages, multimedia messages (e.g., colloquially referred to by some as "an MMS"), image files, video files, audio files, ring tones, streaming audio, streaming video, data feeds (including podcasts) and so forth. Processing such data may include storing the data in the memory 16, executing applications to allow user interaction with data, displaying video and/or image content associated with the data, outputting audio sounds associated with the data and so forth.

FIG. 2 represents a functional block diagram of the mobile telephone 10. For the sake of brevity, generally conventional features of the mobile telephone 10 will not be described in great detail herein. The mobile telephone 10 includes a primary control circuit 20 that is configured to carry out overall control of the functions and operations of the mobile telephone 10. The control circuit 20 may include a processing device 22, such as a CPU, microcontroller or microprocessor. The processing device 22 executes code stored in a memory (not shown) within the control circuit 20 and/or in a separate memory, such as memory 16, in order to carry out operation of the mobile telephone 10. The memory 16 may be, for example, one or more of a buffer, a flash memory, a hard drive, a removable media, a volatile memory, a non-volatile memory or other suitable device.

In addition, the processing device 22 may execute logical instructions that implement the code management function 12. It will be apparent to a person having ordinary skill in the art of computer programming, and specifically in application programming for mobile telephones or other electronic devices, how to program a mobile telephone 10 to operate and carry out logical functions associated with the code management function 12. Accordingly, details as to specific programming code have been left out for the sake of brevity. Also, while the code management function 12 is executed by the processing device 22 in accordance with a preferred embodiment of the invention, such functionality could also be carried out via dedicated hardware, firmware, software, or combinations thereof, without departing from the scope of the invention.

Continuing to refer to FIGS. 1 and 2, the mobile telephone 10 includes an antenna 24 coupled to a radio circuit 26. The radio circuit 26 includes a radio frequency transmitter and receiver for transmitting and receiving signals via the antenna 24 as is conventional. The radio circuit 26 may be configured to operate in a mobile communications system and may be used to send and receive data and/or audiovisual content. Receiver types for interaction with a mobile radio network and/or broadcasting network include, but are not limited to, GSM, CDMA, WCDMA, GPRS, MBMS, WiFi, WiMax, DVB-H, ISDB-T, Bluetooth, etc. as well as advanced versions of these standards.

The mobile telephone 10 further includes a sound signal processing circuit 28 for processing audio signals transmitted by and received from the radio circuit 26. Coupled to the sound processing circuit 28 are a speaker 30 and a microphone 32 that enable a user to listen and speak via the mobile telephone 10 as is conventional. The radio circuit 26 and sound processing circuit 28 are each coupled to the control circuit 20 so as to carry out overall operation. Audio data may be passed from the control circuit 20 to the sound signal processing circuit 28 for playback to the user. The audio data may include, for example, audio data from an audio file stored by the memory 18 and retrieved by the control circuit 20, or received audio data such as in the form of streaming audio data from a mobile radio service. The sound processing circuit 28 may include any appropriate buffers, decoders, amplifiers and so forth.

The display 14 may be coupled to the control circuit 20 by a video processing circuit 34 that converts video data to a video signal used to drive the display 14. The video processing circuit 34 may include any appropriate buffers, decoders, video data processors and so forth. The video data may be generated by the control circuit 20, retrieved from a video file that is stored in the memory 16, derived from an incoming video data stream received by the radio circuit 28 or obtained by any other suitable method.

The mobile telephone 10 further includes one or more I/O interface(s) 36. The I/O interface(s) 36 may be in the form of typical mobile telephone I/O interfaces and may include one or more electrical connectors. As is typical, the I/O interface(s) 36 may be used to couple the mobile telephone 10 to a battery charger to charge a battery of a power supply unit (PSU) 38 within the mobile telephone 10. In addition, or in the alternative, the I/O interface(s) 36 may serve to connect the mobile telephone 10 to a headset assembly (e.g., a personal handsfree (PHF) device) that has a wired interface with the mobile telephone 10. Further, the I/O interface(s) 36 may serve to connect the mobile telephone 10 to a personal computer or other device via a data cable for the exchange of data. The mobile telephone 10 may receive operating power via the I/O interface(s) 36 when connected to a vehicle power adapter or an electricity outlet power adapter.

The mobile telephone 10 may also include a timer 40 for carrying out timing functions. Such functions may include timing the durations of calls, generating the content of time and date stamps, etc. The mobile telephone 10 may include a camera 42 for taking digital pictures and/or movies. Image and/or video files corresponding to the pictures and/or movies may be stored in the memory 16. The mobile telephone 10 also may include a position data receiver 44, such as a global positioning system (GPS) receiver, Galileo satellite system receiver or the like.

The mobile telephone 10 also may include a local wireless interface 46, such as an infrared transceiver and/or an RF adaptor (e.g., a Bluetooth adapter), for establishing communication with an accessory, another mobile radio terminal, a computer or another device. For example, the local wireless interface 46 may operatively couple the mobile telephone 10 to a headset assembly (e.g., a PHF device) in an embodiment where the headset assembly has a corresponding wireless interface.

Figure 3:
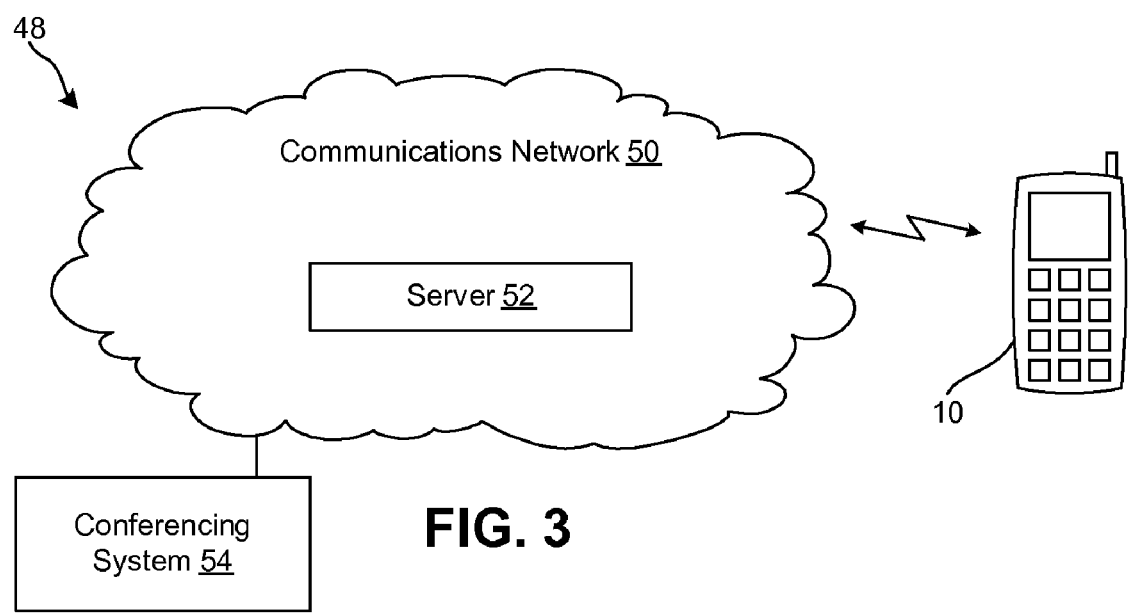
FIG. 3 is a schematic diagram of a communications system in which the mobile telephone of FIG. 1 may operate.

With additional reference to FIG. 3, the mobile telephone 10 may be configured to operate as part of a communications system 48. The system 48 may include a communications network 50 having a server 52 (or servers) for managing calls placed by and destined to the mobile telephone 10, transmitting data to the mobile telephone 10 and carrying out any other support functions. The server 52 communicates with the mobile telephone 10 via a transmission medium. The transmission medium may be any appropriate device or assembly, including, for example, a communications tower (e.g., a cell tower), another mobile telephone, a wireless access point, a satellite, etc. Portions of the network may include wireless transmission pathways. The network 50 may support the communications activity of multiple mobile telephones 10 and other types of end user devices. As will be appreciated, the server 52 may be configured as a typical computer system used to carry out server functions and may include a processor configured to execute software containing logical instructions that embody the functions of the server 52.

The communications network 50 may interface with a conferencing system 54 that allows users to call a central telephone number to join into a conference call. In many cases, the user will be requested by the system 54 to enter a code so that the user's call may be connected to the desired conference call. The user may be privy to plural codes that are used on a regular or irregular basis. In some conferencing systems, the code may be referred to as a personal identification number (PIN). The code (or PIN) may be, at least in part, a numerical value (e.g., a number) and is not necessarily personal to the user of the mobile telephone 10. For instance, the code may be known to multiple potential participants in the conference call associated with the code. In some conferencing systems, for any given conference call there may be a private moderator code and a public code used by the remaining participants.

Figure 4:
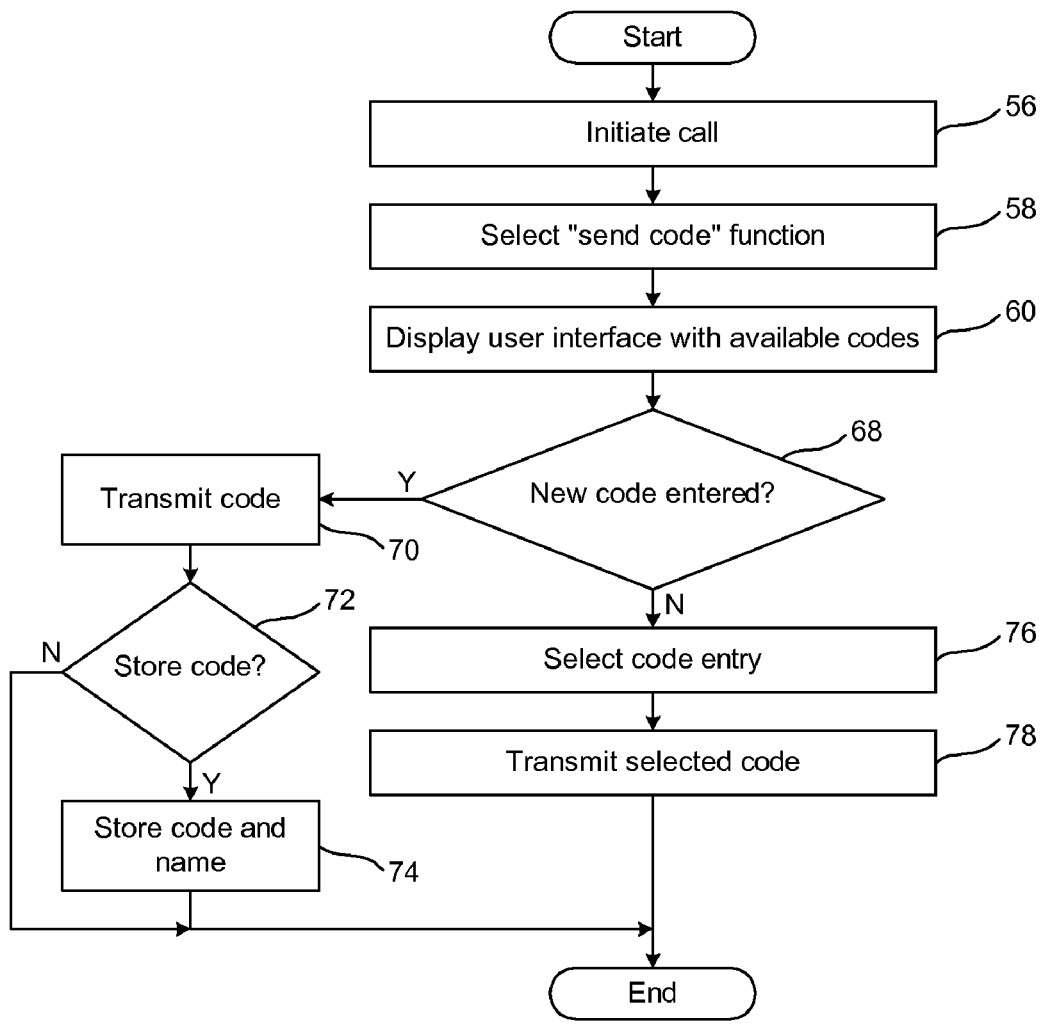
FIG. 4 is a flow chart representing an exemplary method of managing multiple codes using the mobile telephone of FIG. 1.

With additional reference to FIG. 4, illustrated are logical operations to implement an exemplary method of managing multiple codes for a particular telephone number. The exemplary method may be carried out by executing an embodiment of the code management function 12, for example. Thus, the flow chart of FIG. 4 may be thought of as depicting steps of a method carried out by the mobile telephone 10. Although FIG. 4 shows a specific order of executing functional logic blocks, the order of execution of the blocks may be changed relative to the order shown. Also, two or more blocks shown in succession may be executed concurrently or with partial concurrence. Certain blocks also may be omitted. In addition, any number of commands, state variables, semaphores or messages may be added to the logical flow for purposes of enhanced utility, accounting, performance, measurement, troubleshooting, and the like. It is understood that all such variations are within the scope of the present invention. User actions that are described herein, such as dialing a telephone number, sending a code, making a menu selection, etc., may be made by keyboard 18 action, voice input or any other suitable manner.

The logical flow for the code management function 12 may begin in block 56 where the user initiates a call. In an exemplary application of using the code management function 12, the call may be placed to the conferencing system 54. For instance, the user may dial a centralized telephone number to establish a call to the conferencing system 54. The number may be manually dialed by the user or dialed in response to user selection of the number from an entry in contact list database.

After the call has been connected, the conferencing system 54 may prompt the user to enter a code so that the user may be connected to a conference call associated with the code. Proceeding to block 58, the user may select a send code function from a menu of user action choices. In one embodiment, selecting the send code function many lead to the display of a graphical user interface that may assist the user in selecting one of several codes to transmit. Thus, in block 60, a user interface with codes that are associated with the number dialed in block 56 may be displayed. In one embodiment, the user interface may be displayed without user action (e.g., automatically) when the dialed telephone number has one or more associated codes.

Figure 5:
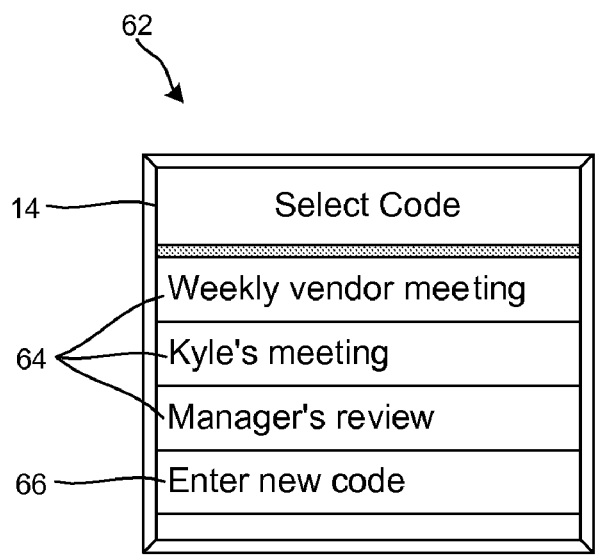
FIG. 5 is a representation of an exemplary graphical user interface for use in managing multiple codes.

With additional reference to FIG. 5, shown is a representation of an exemplary graphical user interface 62 for use in managing multiple codes that may be displayed on the display 14 as part of block 60. If codes have already been associated with the telephone number, those codes (e.g., numerical code values) and/or corresponding names for the codes may be displayed as selectable code entry choices, or established codes 64. The name of a code may be any user established mnemonic to assist the user recall information related to the code. The numerical value and name for the established codes 64 may be stored in any appropriate manner. For example, the established codes 64 may be stored in a database structure, such as part of an otherwise conventional contact list database. In the example of FIG. 5, three established codes 64 are present and are identified by name only (e.g., the numerical code value is not displayed). For the example of FIG. 5, the names for the three established codes 64 are "Weekly vendor meeting," "Joe's meeting," and "Manager's review." Of course, these names are arbitrary and actual names that the user associates with various codes will be determined by user action. The user interface 62 also has a menu choice 66 for the user to enter a new code. Also, the user may be offered a menu choice to edit an established code 64. In the case where there are no established codes 64, the menu choice 66 to enter a new code may be the only choice in the user interface 62.

Proceeding to block 68, a determination is made as to whether the user has selected to enter a new code, such as by selecting the menu choice 66. Selecting the menu choice 66 may provide the user with a data entry interface so that the user may enter the new code as, for example, a string of characters. If a new code is entered, the entered code may be transmitted to the conferencing system 54 in block 70. The code may be transmitted in the form of DTMF signals, for example. The user may be provided with the option to store the code for reuse at some time in the future. Therefore, proceeding to block 72, if the user opts to store the code, the user may be prompted to enter a name that corresponds to the code. The name may be, for example, any alphanumeric character string that may assist the user in selecting the code the next time the user initiates a call to the conferencing system 54. Proceeding to block 74, after the name for the code has been entered, the code and the name may be stored in association with the telephone number dialed in block 56. The stored code may then become one of the established codes 64 that are displayed in the user interface 62 during future iterations of the logical flow.

Other ways of storing a code and name may be possible. For example, in an operation apart from dialing the number, the user may have the opportunity to enter a code and associated name by navigating through choices in a user interface. In one embodiment, the opportunity to add codes and corresponding names in association with a phone number may be provided as part of contact list management function of the mobile telephone 10. The next time that the telephone number is dialed, the stored code(s) may be made available to the user for transmission as one of the established codes 64. Also, the user interface options may allow the user to edit and/or delete established codes 64.

Returning to block 72, if the user does not opt to store the code in block 72 (e.g., in the case where the code may have a one-time use), the logical flow may end.

Returning to block 68, if a new code has not been entered, the logical flow may proceed to block 76. In block 76, the user may select one of the established codes 64 for transmission to the conferencing system 54. The user may select the code by choosing from the displayed list of established codes 64. Thereafter, in block 78, the selected code may be transmitted in an appropriate form, such as by dialing the numeric value of the code to transmit DTMF signals.

As will be appreciated, described in connection with FIGS. 4 and 5 is an exemplary method of managing multiple codes for a telephone number. While the method was described in the exemplary context of calling a conferencing system, the method and user interface may be used in other situations. For instance, the telephone number for which codes and corresponding names are stored may be a central telephone number for a corporation that prompts a caller to dial an extension number to reach an individual of interest. If the user dials the telephone number to reach multiple persons, the user may associate the extensions for those persons and their names with the telephone number to facilitate calling various extensions. In this exemplary context, the extension numbers are the codes and the person's names or positions may be used as the names for the codes. In another example, a customer service telephone number may prompt the caller to dial various numbers to navigate an automated menu. If the user dials the telephone number with regularity and takes divergent paths through the automated menu, the user may associate the numerical values for various menu choices with the telephone number to facilitate navigation of the automated menu. In another example, the codes may be PINs for use with a secure system for checking the identity of the user or authorizing a transaction. For instance, the codes may be PIN codes for a telephone banking system. In one embodiment, the selection of an established code 64 for transmission and/or viewing may be protected by another code (e.g., a PIN that limits access to the codes stored by the mobile telephone 10).

Each of the multiple codes that are associated with a telephone number may be individually named by the user. Also, each code may be comprised of a string of numbers and/or other characters, such as the pound symbol (#), the star symbol (*) and/or letters. Since the method of managing multiple codes may be applied to a variety of situations, the term "code" is broadly used herein to refer to any data string that may be transmitted to a remotely located system or device. The stored codes need not be transmitted as part of a telephone call and/or need not be transmitted as a dialing signal (e.g., DTMF signals). For instance, the code management function 12 could be modified to store plural text messages in association with an individual text message destination. In yet another example, the codes may be digital certificates used in a VoIP system or for a security authentication process.

The techniques to manage multiple codes for a telephone number that are described herein may be modified so that the mobile telephone 10 (or some other device) generates DTMF signals (or other output) for the telephone number and/or the selected code, but another device establishes the call. In one embodiment, the signals may be output from the speaker 30 for reception by a wired phone. The wired phone, in turn, dials the number and/or sends the code using the received DTMF signals.

In another variation, if only one code is associated with a dialed telephone number, the mobile telephone 10 may be configured to send the code automatically after a call to the telephone number has been established (e.g., without the user interaction described with respect to block 58).

Although the invention has been shown and described with respect to certain preferred embodiments, it is understood that equivalents and modifications will occur to others skilled in the art upon the reading and understanding of the specification. The present invention includes all such equivalents and modifications, and is limited only by the scope of the following claims.

What is claimed is:

1. A method of managing multiple codes for a single telephone number, comprising:
    associating plural codes with the single telephone number, each code stored in association with a user recognizable name and each code being a data string entered by the user to join a conference call corresponding to the data string from a conference call system associated with the single telephone number;
    initiating a call to the conference call system associated with the single telephone number, the conference call system prompting the user for a code corresponding to a conference call to be joined;
    displaying at least the names of the codes for user selection; and
    transmitting a signal in accordance with the code that corresponds to a user selected one of the names to the conference call system.

2. The method of claim 1, wherein the code is transmitted as DTMF signals.

3. The method of claim 1, wherein the displaying is carried out after user selection of a send code menu option that is made available in connection with the display or dialing of the single telephone number.

4. The method of claim 1, wherein for each code, the displaying displays the name and a value of each code.

5. The method of claim 1, wherein the codes are identification numbers for the conference call system reachable through the single telephone number and each code is associated with a different, reoccurring conference call.

6. The method of claim 1, wherein the names are established by the user.

7. The method of claim 1, wherein the codes and the names are maintained as part of a contact list database.

8. A non-transitory computer readable medium storing a program for managing multiple codes for a single telephone number, which when executed by a processor performs steps, comprising logic to:
    associate plural codes with the single telephone number, each code stored in association with a user recognizable name and each code being a data string entered by the user to join a conference call corresponding to the data string from a conference call system associated with the single telephone number;
    initiate a call to the conference call system associated with the single telephone number, the conference call system prompting the user for a code corresponding to a conference call to be joined;
    display at least the names of the codes for user selection; and
    transmit a signal in accordance with the code that corresponds to a user selected one of the names to the conference call system.

9. The program of claim 8, wherein the displaying is carried out after user selection of a send code menu option that is made available in connection with the display or dialing of the single telephone number.

10. The program of claim 8, wherein the codes are identification numbers for the conference call system reachable through the single telephone number and each code is associated with a different, reoccurring conference call.

11. An electronic device, comprising
    a radio circuit that establishes telephone calls with a remotely located device; and
    a control circuit that carries out logical operations to manage multiple codes for a single telephone number, including:
        associate plural codes with the single telephone number, each code stored in association with a user recognizable name and each code being a data string entered by the user to join a conference call corresponding to the data string from a conference call system associated with the single telephone number;

initiate a call to the conference call system associated with the single telephone number, the conference call system prompting the user for a code corresponding to a conference call to be joined;

drive a display to display at least the names of the codes for user selection; and transmit a signal in accordance with the code that corresponds to a user selected one of the names to the conference call system.

12. The electronic device of claim 11, wherein the displaying is carried out after user selection of a send code menu option that is made available in connection with the display or dialing of the single telephone number.

13. The electronic device of claim 11, wherein the codes are identification numbers for the conference call system reachable through the single telephone number and each code is associated with a different, reoccurring conference call.

14. The electronic device of claim 11, wherein the codes and the names are maintained as part of a contact list database.

* * * * *